May 18, 1965     T. L. BAILEY     3,183,544
YIELDABLE CASTER

Filed Dec. 7, 1962     2 Sheets-Sheet 1

INVENTOR.
THEODORE L. BAILEY,
BY
McMorrow, Berman & Davidson
ATTORNEYS.

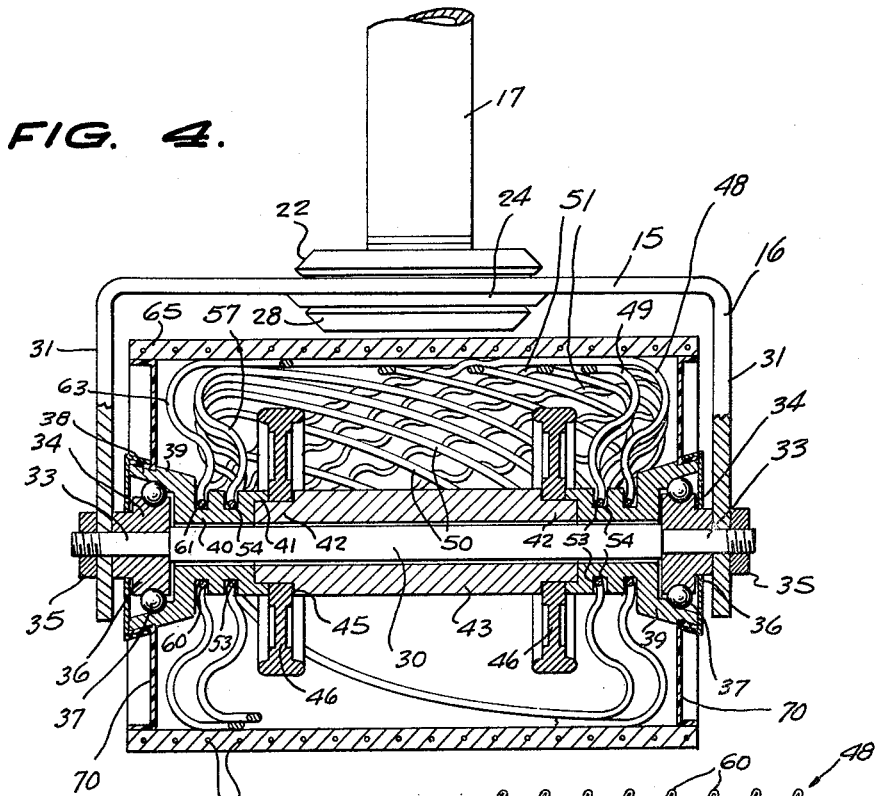
FIG. 4.
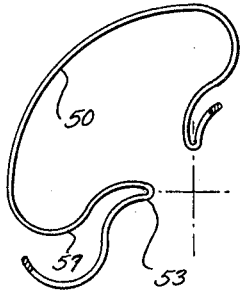
FIG. 5.
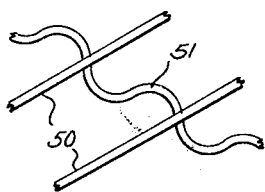
FIG. 6.
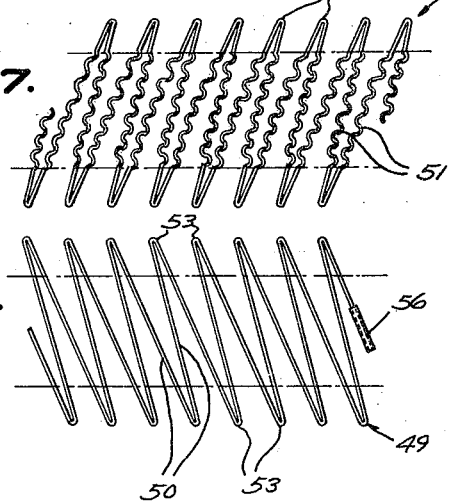
INVENTOR.
THEODORE L. BAILEY,
BY
McMorrow, Berman & Davidson
ATTORNEYS.

United States Patent Office 3,183,544
Patented May 18, 1965

3,183,544
YIELDABLE CASTER
Theodore L. Bailey, New York, N.Y.
(529 County Line Road, Radnor, Pa.)
Filed Dec. 7, 1962, Ser. No. 242,955
6 Claims. (Cl. 16—18)

This invention relates to an improved caster for furniture, and more particularly, to a caster which is resiliently yieldable to provide a relatively large bearing surface under heavy load so as to minimize damage or wear on flooring and carpeting subjacent thereto.

A main object of the invention is to provide an improved resiliently yieldable caster which is relatively simple in construction, which is easy to install, and which has a large effective bearing area when under heavy load so that the subjacent carpeting or flooring is not cut or damaged when the caster is moved thereover.

A further object of the invention is to provide an improved resiliently yieldable caster which is inexpensive to manufacture, which is durable in construction, which deforms in accordance with the magnitude of the load imposed thereon so as to flatten out its bottom bearing surface and distribute the load thereover, and which is rotatable under load so that it can roll over the floor or carpeting subjacent thereto without damage to said floor or carpeting.

Further objects and advantages of the invention will become apparent from the following description and claims, and from the accompanying drawings, wherein:

FIGURE 4 is a vertical cross sectional view taken substantialy on the line 4—4 of FIGURE 3.

FIGURE 5 is an enlarged fragmentary perspective view of a portion of one of the cushioning spring elements forming a part of the resilient wire mesh basket employed in the caster of FIGURES 1 to 4.

FIGURE 6 is an enlarged fragmentary perspective view showing the manner in which the sinuously curved spring wire elements are overlaid over the substantially straight wire portions of the wire mesh basket employed in the caster of FIGURES 1 to 4.

FIGURE 7 is a fragmentary developed plan view of the sinuously curved elements of the outer closed resilient wire member employed in the basket structure of the caster of FIGURES 1 to 4.

FIGURE 8 is a fragmentary developed plan view of a portion of the inner closed resilient wire member employed in the basket member of the caster of FIGURES 1 to 4.

Figure 3:
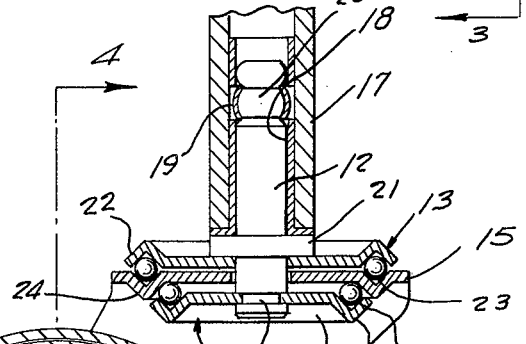
FIGURE 3 is a somewhat enlarged transverse vertical cross sectional view taken substantially on the line 3—3 of FIGURE 2.
Figure 3:
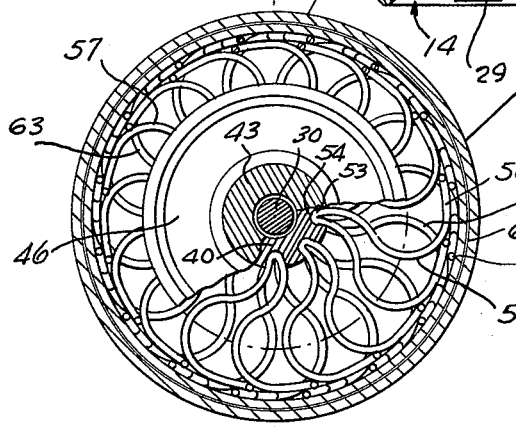

Referring to the drawings, 11 generally designates an improved caster constructed in accordance with the present invention. The caster 11 comprises a vertical shank 12 which is journaled by means of upper and lower ball bearing assemblies 13 and 14 to the intermediate portion of the bight element 15 of a yoke 16. As shown in FIGURE 3, the shank 12 is adapted to be lockingly engaged within the sleeve or receptacle 17 associated with the leg of a piece of furniture, the sleeve 17 being provided with an inner resilient locking sleeve element 18 which has an inwardly offset annular yieldable portion 19 lockingly engageable in an annular locking groove 20 provided on the shank 12.

The shank 12 is provided with an enlarged collar element 21 which bears on the annular grooved top disc 22 of the upper ball bearing assembly 13, ball bearings 23 being provided in the annular groove of the member 22, said ball bearings being received in an annular channel 24 formed in the bight portion 15. The annular channel 24 is substantially V-shaped in transverse cross section, and the bearing balls 25 of the lower ball bearing assembly 14 are held against the inside wall of the bottom surface of the annular channel 24 by an annularly grooved bottom raceway disc 27. As shown in FIGURE 3, the disc 27 has the upwardly facing peripheral annular channel 28 in which the balls 25 are seated and held against the inside wall of the depending V-shaped annular channel 24.

As shown in FIGURE 3, the bottom raceway disc 14 is secured to the lower end portion of shank 12 by being fastened in an annular groove 29 provided in the lower end portion of said shank element 12.

Designated at 30 is a transverse shaft which is secured between the lower end portions of the side arms 31, 31 of the yoke 16. As shown in FIGURE 4, the shaft 30 has the reduced end portions 33, 33 which extend through the lower end portions of the side arms 31, 31 and on which are mounted the respective collar elements 34, 34. Fastening nuts 35, 35 are threadedly engaged on the outer end portions of the members 33, 33, clamping the lower end portions of the side arms 31, 31 between the nuts 35 and the collars 34.

The collar members 34 are provided with enlarged inner portions having peripheral grooves 36 in which are supported ball bearings 37 which are held against inwardly convergent frusto-conical raceways 38 provided in respective cup members 39, 39 surrounding the end portions of shaft 30. The cup members 39 have inwardly extending shank portions 40 which are formed with inwardly facing recesses 41 which receive the respective reduced end portions 42, 42 of an intermediate sleeve member 43 surrounding the mid portion of shaft member 30. Mounted on the reduced portions 42 and disposed between the annular shoulders 45 and the rim portions of the recesses 41 are respective rigid supporting discs 46, 46.

Secured on the composite sleeve means defined by member 43 and members 39, 39 is a generally cylindrical resilient wire mesh basket of resilient wire material comprising a first closed resilient wire member 48 and a second closed resilient wire member 49, the closed resilient wire member 49 being disposed inside of the closed resilient wire member 48 and having peripheral diagonally extending wire elements 50 which cross the peripheral diagonally extending wire elements 51 of the outer member 48 at substantial angles. Thus, the inner member 49 comprises a closed resilient wire loop formed with the substantially diagonally extending main intermediate portion 52 and terminating in the relatively acutely angled loop ends 53 which are anchored in recesses 54 provided on the shank portions 40 adjacent the disc members 46. The meeting ends of the wire member 49 are connected by a fastening sleeve 56 so that the member 49 is a continuous loop, and the elements forming said members are sinuously curved at their end portions so as to be directed inwardly, having the inwardly extending sinuously curved spring portions 57 leading to the tips 53 which are lockingly engaged in the recesses 54.

The outer spring wire member 48 is formed in a similar fashion and includes the sinuously curved loop arms 51 terminating in the acutely angled tips 60 which are anchored in recesses 61 provided in the shank members 40, the recesses 61 being spaced outwardly from the recesses 54, as is clearly shown in FIGURE 4. The outer spring wire member 48 is a continuous wire, the meeting end portions of the wire being connected in the same manner as in the case of the inner resilient wire member 49, and said outer member 48 being provided with the sinuously curved bends 63 leading to the anchored tips 60, the bends 63 being spaced outwardly from and being substantially parallel to the bends 57 of the inner wire member 49.

As above mentioned, the sinuously curved wire arm elements 51 overlie the substantially straight wire elements 50 and cross the wire elements 50 at the periphery of the wire basket at substantial angles thereto, as is clearly shown in FIGURE 6.

Designated at 65 is a resilient deformable generally cylindrical outer shell of rubber, or similar resilient deformable material, the outer shell member 65 being of substantial axial length and closely receiving the resilient wire mesh basket defined by the members 48 and 49 so that the wire elements of the basket normally conform resiliently to the cylindrical inside contour of the shell or tread member 65. The resilient deformable shell or tread member 65 may be internally reinforced by the embedment therein of flexible but non-elastic filaments of wire, fabric, or the like, shown at 67, the reinforcing filaments 67 comprising, for example, the turns of a spirally coiled length of filamentary material molded in the shell member.

Respective resilient cover discs 70, 70 are secured in the ends of the shell or tread member 65, the discs 70 being made of rubber, or other flexible resilient material, such as sheet plastic material, or the like, the cover discs 70 being secured on the peripheral portions of the cup members 39 and extending inwardly substantially into contact with the outwardly extending shank portions of the collar members 34.

Figure 1:
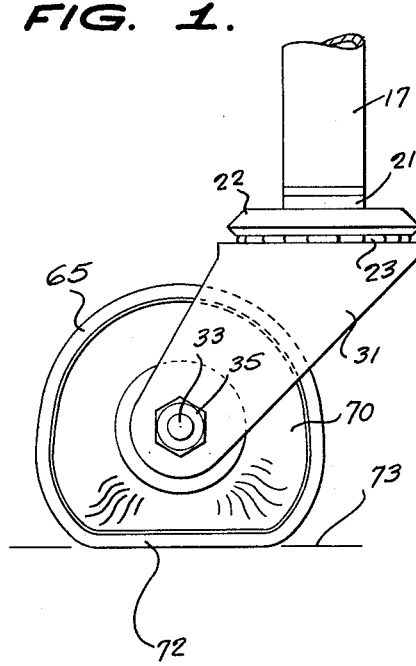
FIGURE 1 is a fragmentary side elevational view of an improved resiliently yieldable caster device constructed in accordance with the present invention.
Figure 2:
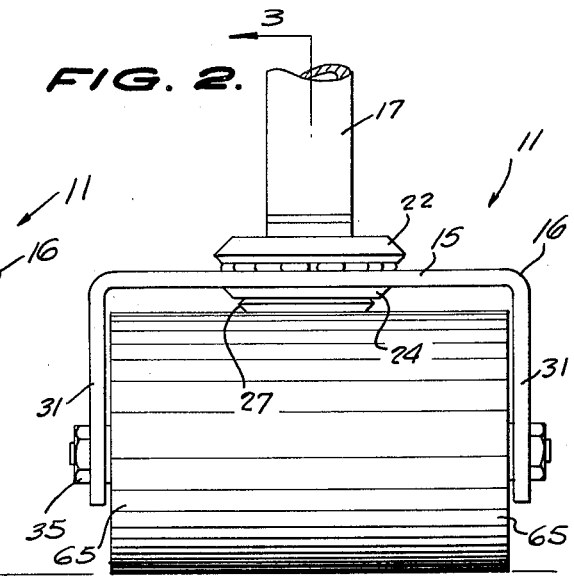
FIGURE 2 is a front elevational view of the caster device of FIGURE 1.

As will be seen from FIGURE 4, the rigid supporting discs 46, 46 are substantially smaller in diameter than the normal inside diameter of the basket structure comprising the members 48 and 49, thus allowing a considerable amount of deformation of said basket structure under load. For example, under heavy loading the basket structure may yield sufficiently to allow the shell or tread member 65 to deform to provide a flat bottom portion 72 of considerable area, whereby the load is distributed over said area preventing concentration of force at any localized point on the subjacent flooring or carpeting 73. The caster roller element comprising the shell or tread member 65 and the structure contained therein may thereby conform to the configuration substantially shown in FIGURE 1. However, the roller elements are still rotatable around the axis of the shaft 30, so that the piece of furniture supported thereby may be moved on its casters even though the casters are deformed to the configuration substantially illustrated in FIGURE 1. Such movement may be accomplished without causing any damage or cutting of the subjacent flooring or carpeting 73.

The provision of the upper and lower ball bearing assemblies 13 and 14 between the shank 12 and the bight portion 15 of yoke 16 provides free swiveling action of the caster, even under very heavy loads, thus facilitating the free swiveling action of the caster under these conditions. Thus, when it is attempted to move a piece of furniture provided with casters such as above described, the casters swivel freely to align the rotating portions thereof in the direction of movement, and the casters rotate freely, even though they are substantially deformed, for example, to the configuration shown in FIGURE 1, due to the severe loading placed thereon. Because of such deformation, however, the piece of furniture may be moved over floor or carpeting without damage to said floor or carpeting, since, as above explained, the loading is distributed over substantially large bottom areas of the caster tread portions.

While a specific embodiment of an improved yieldably deformable caster has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A caster comprising a yoke, a vertical shank journaled to the bight portion of said yoke, a transverse shaft of substantial length secured to the side arms of said yoke, sleeve means journaled on said shaft, a generally cylindrical resilient wire mesh basket secured on said sleeve means and extending axially for a substantial portion of the length of said sleeve means, and a resilient deformable outer tread shell secured on said sleeve means surrounding and resiliently engaging said wire mesh basket.

2. A caster comprising a yoke, a vertical shank journaled to the bight portion of said yoke, a transverse shaft of substantial length secured to the side arms of said yoke, sleeve means journaled on said shaft, a generally cylindrical resilient wire mesh basket secured on said sleeve means and extending axially for a substantial portion of the length of said sleeve means, a resilient deformable outer tread shell secured on said sleeve means surrounding and resiliently engaging said wire mesh basket, and a plurality of spaced rigid supporting disc members mounted on said sleeve means inside said wire mesh basket, at least two of said disc members being located inwardly adjacent the respective ends of said wire basket.

3. A caster comprising a yoke, a vertical shank journaled to the bight portion of said yoke, a transverse shaft of substantial length secured to the side arms of said yoke, sleeve means journaled on said shaft, a generally cylindrical resilient wire mesh basket secured on said sleeve means and extending axially for a substantial portion of the length of said sleeve means, said wire mesh basket comprising a first closed resilient wire member formed with diagonally extending loops having inwardly extending sinuously curved end portions anchored in opposite end portions of said sleeve means, and a second closed resilient wire member inside the first resilient wire member formed with diagonally extending loops underlying and crossing the loops of the first wire member at substantial angles thereto at the periphery of the wire basket, the loops of said second closed resilient wire member having inwardly extending sinuously curved end portions anchored in said opposite end portions of the sleeve means, and a resilient deformable outer tread shell secured on said sleeve means surrounding and resiliently engaging said wire mesh basket.

4. A caster comprising a yoke, a vertical shank journaled to the bight portion of said yoke, a transverse shaft of substantial length secured to the side arms of said yoke, sleeve means journaled on said shaft, a generally cylindrical resilient wire mesh basket secured on said sleeve means and extending axially for a substantial portion of the length of said sleeve means, said wire mesh basket comprising a first closed resilient wire member formed with diagonally extending loops having inwardly extending sinuously curved end portions anchored in opposite end portions of said sleeve means, and a second closed resilient wire member inside the first resilient wire member formed with diagonally extending loops underlying and crossing the loops of the first wire member at substantial angles thereto at the periphery of the wire basket, the loops of said second closed resilient wire member having inwardly extending sinuously curved end portions anchored in said opposite end portions of the sleeve means, the side elements of the loops of at least one of said closed resilient wire members being sinuously curved, and a resilient deformable outer tread shell secured on said sleeve means surrounding and resiliently engaging said wire mesh basket.

5. A caster comprising a yoke, a vertical shank journaled to the bight portion of said yoke, a transverse shaft of substantial length secured to the side arms of said yoke, sleeve means journaled on said shaft, a generally cylindrical resilient wire mesh basket secured on said sleeve means and extending axially for a substantial portion of the length of said sleeve means, said wire mesh basket comprising a first closed resilient wire member formed with diagonally extending loops having inwardly extending sinuously curved end portions anchored in opposite end portions of said sleeve means, and a second closed resilient wire member inside the first resilient wire member formed with diagonally extending loops underlying and crossing the loops of the first wire member at substantial angles thereto at the periphery of the wire basket, the loops of said second closed resilient wire member having inwardly extending sinuously curved end portions anchored in said opposite end portions of the sleeve means, the side elements of the loops of at least one of said closed resilient wire members being sinuously curved, a resilient deformable outer tread shell secured on said sleeve means surrounding and resiliently engaging said wire mesh basket, and a plurality of spaced rigid supporting disc members mounted on said sleeve means inside said wire mesh basket, at least two of said disc members being located inwardly adjacent the respective ends of said wire basket.

6. A caster comprising a yoke, a vertical shank journaled to the bight portion of said yoke, a transverse shaft of substantial length secured to the side arms of said yoke, sleeve means journaled on said shaft, a generally cylindrical resilient wire mesh basket secured on said sleeve means and extending axially for a substantial portion of the length of said sleeve means, said wire mesh basket comprising a first closed resilient wire member formed with diagonally extending loops having inwardly extending sinuously curved end portions anchored in opposite end portions of said sleeve means, and a second closed resilient wire member inside the first resilient wire member formed with diagonally extending loops underlying and crossing the loops of the first wire member at substantial angles thereto at the periphery of the wire basket, the loops of said second closed resilient wire member having inwardly extending sinuously curved end portions anchored in said opposite end portions of the sleeve means, the side elements of the loops of at least one of said closed resilient wire members being sinuously curved, a resilient deformable outer tread shell secured on said sleeve means surrounding and resiliently engaging said wire mesh basket, a plurality of spaced rigid supporting disc members mounted on said sleeve means inside said wire mesh basket, at least two of said disc members being located inwardly adjacent the respective ends of said wire basket, and respective resilient cover discs secured around said sleeve means in the opposite end portions of said resilient deformable tread shell.

References Cited by the Examiner
UNITED STATES PATENTS

| | | | |
|---|---|---|---|
| 416,095 | 11/89 | Bogory | 152—12 |
| 1,146,654 | 7/15 | Rietschel | 152—11 |
| 2,267,403 | 12/41 | Herold | 16—45 |

DONLEY, J. STOCKING, *Primary Examiner.*